April 24, 1962 R. A. HUDSON 3,031,198
LIQUID SEAL FOR MOVABLE MEMBERS
Filed May 16, 1957
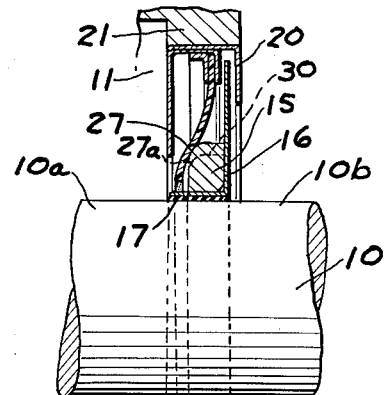
Fig. 1
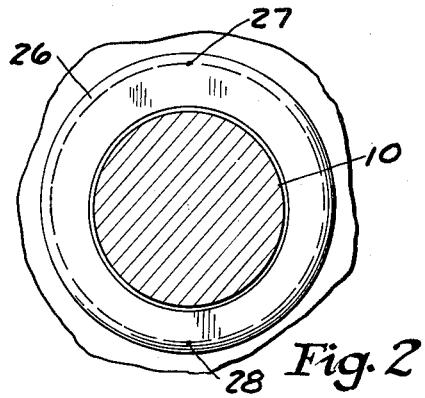
Fig. 2
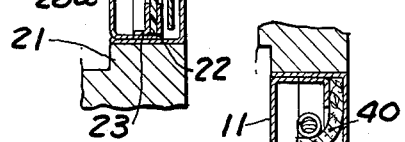
Fig. 5
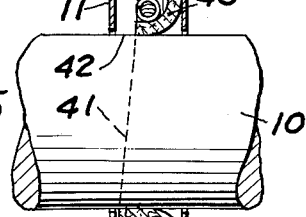
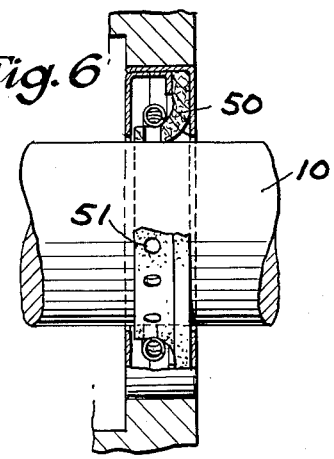
Fig. 6
Fig. 7
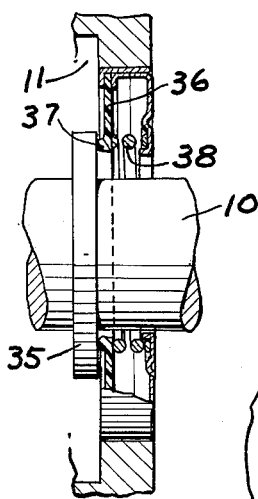
Fig. 3
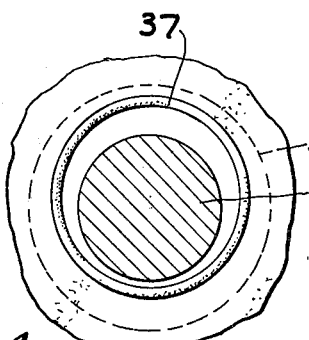
Fig. 4
INVENTOR.
RAYMOND A. HUDSON
BY
*Gregory L. Dolgorukov*
ATTORNEY.

United States Patent Office 3,031,198
Patented Apr. 24, 1962

3,031,198
LIQUID SEAL FOR MOVABLE MEMBERS
Raymond A. Hudson, Birmingham, Mich.
(932 Eveline Orchards, East Jordan, Mich.)
Filed May 16, 1957, Ser. No. 659,703
2 Claims. (Cl. 277—42)

This invention relates to liquid seals and more particularly to an improved oil seal for shafts and other movable or rotatable members.

Within recent years the number of applications requiring oil seals has greatly increased. At the same time the troubles with such oil seals, often having serious safety implication, have increased in spite of the fact that new and presumably better materials have been used in constructing such seals. I have found that such difficulties resulted in a certain measure from the increase in requirements for such oil seals such, for instance, as requiring such seals to operate at higher temperatures and pressures, i.e. to seal hot oil having higher operating temperatures and pressures than was common heretofore and at shafts operating at much greater speeds. Failure of oil seals under such conditions has become so common as to constitute one of the major problems now facing the industry. The largest concerns in this country have realized this fact, and undertaking fundamental research in this field is advocated by many leading engineers as the only way to seek the solution for this puzzling problem which is of very large and growing proportions.

Particularly it has been found that leather oil seals which for a good many years have been considered to be fully reliable for the usual requirements of the past proved to be unsuitable for many present-day applications. As the temperature under which a leather seal has to operate increases, leather becomes hard and loses its resiliency, whereupon it cannot perform its sealing function properly, rendering the seal virtually useless.

The use of "rubber" seals has recently come into relatively wide use. With such seals, the resilient sealing ring is actually made of various synthetic rubber-like materials not affected by oil. Such rubber seals, while having been acclaimed at first as a solution to oil seal problems, nevertheless soon showed an alarming percentage of failures with such failures often occurring after a relatively short period of operation. This condition proved to be particularly discouraging to those skilled in the art since oil seals made of synthetic rubber-like materials seem to fail unexpectedly and without giving signs of gradual deterioration of the seal which signs could be detected in time by inspection giving an opportunity to replace the seal which is about to fail. Such sudden failures of seals constitute serious danger in instances such as aircraft and other transportation instrumentalities where unexpected failure of a seal may cause loss of lubricants or of hydraulic fluid operating various devices. Sudden loss of such lubricants or operating fluids may cause failures of vital components of the craft and thus endanger the entire craft and its occupants. Even in cases of motor vehicles, failure of a seal may have serious consequences since an average automobile driver may not notice failure of the seal as such, and may not even notice failure of the affected device until the motor vehicle begins to produce an unaccustomed noise or otherwise gives indication of a faulty operation. By that time the damage is usually done, and replacement not only of the seal but of expensive components of the vehicle may be necessary. Moreover, since such failure may occur on the road and during the winter or at night, and particularly in mountain driving when the engine becomes particularly hot, possibilities of such failures are very objectionable.

It should be appreciated that present-day automobile depends for its control on power brakes and power steering, both of which are fluid operated. Therefore, leakage or loss of such fluid affecting proper operation of steering and brakes is a matter of critical concern. In addition to impairing actuation of the brakes, leakage of brake-operating fluid is also dangerous due to the fact that such leakage may occur in places where the leaking fluid may get on the brake drums and lining, making the brake inoperative. This, in turn, may cause swaying of the vehicle to one side when the brakes are applied, particularly in winter driving. In fact, in cases of trucks such failure of the brakes is often the first indication of leaky seals, i.e. leaky seals are often recognized in trucks by improper operation of the brakes.

It has also been found that even with the lip-type seals made of leather or rubber excessive leakage occurred with new seals around rotating shafts without any apparent reason. It is my present belief that such leakage results in a large measure due to eccentricity of shafts sealed with the aid of lip seals. The lateral thrust produced by eccentricity or "runout" of the shaft greatly increases with the increase of speed and causes portions of the sealing lip to continue its outward motion caused by the shaft creating a gap between such portion and the shaft, which gap may not close for a considerable portion of the shaft revolution and provide opportunity for leakage. I term such seal leakage "inertia leakage."

One of the objects of the present invention is to provide an improved oil seal whereby the above difficulties and disadvantages are overcome and largely eliminated without introducing new problems or increasing appreciably the manufacturing and the service costs involved.

Another object of the present invention is to provide an improved oil seal of any practicable type, such as lip seal or face seal, which is effective to perform its main function, that is, to seal the oil within its enclosure and particularly around various movable members, one part of which operates in a bath of oil and the other protrudes outwardly from such bath. It is appreciated in the art that with such members being movable, such as by virtue of rotation or longitudinal sliding, they do not permit securing the seal to such member.

A further object of the present invention is to provide an improved oil seal which enables more effective sealing and in which increased pressure improves the sealing function of the seal rather than subject it to the danger of failure.

A still further object of the present invention is to provide an improved oil seal which is capable of sealing oil at high temperatures and pressures usually causing failure of conventional seals.

A still further object of the present invention is to provide an improved seal which has a long life and has no tendency to fail suddenly, and with the use of which the necessity of replacement is evident well in advance of the actual failure of the seal.

A still further object of the present invention is to provide an improved oil seal which is more dependable and which has a number of important advantages for use in various instrumentalities in which loss of lubricants or of hydraulic fluids may cause failure of vital mechanisms and thus invite possibilities of a disaster.

A still further object of the present invention is to provide an improved oil seal of the nature specified above which is simple and rugged in construction, safe and dependable in use, and is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

FIG. 1 is a sectional view showing an improved liquid seal embodying the present invention.

FIG. 2 is an end view of the construction of FIG. 1.

FIG. 3 is a sectional view showing a modification embodying the invention.

FIG. 4 is an end view of the construction of FIG. 3.

FIG. 5 is a view showing another modification of a seal of my invention.

FIG. 6 is a sectional view showing a still further modification embodying the present invention.

FIG. 7 is a fragmentary sectional view similar in part to FIGS. 5 and 6 and showing a still further modification.

I came to the conclusion that failures of oil seals, such as described above, are due primarily to the lack of lubrication at the relatively movable sealing surfaces. In spite of sealing oil and being subjected to oil pressure, oil seals, nevertheless, fail for lack of oil to lubricate the seal itself at the mating surfaces of the seal and the movable sealed member. While the above statement may sound paradoxical, nevertheless it is my present belief that it describes accurately the actual situation. This situation is somewhat similar to that where a person on a life raft dies of thirst in the middle of the ocean of water. There the water, in spite of its quantity, and close proximity to such person, is not in the form that can be used by the person's system.

I came to the conclusion that with increased speeds and pressures, oil seals, particularly rubber seals, after a certain period of operation gradually squeeze the oil from between the mating surfaces where the sealing of the movable member, such as a rotating shaft, takes place. When such a condition is reached, the rubber comes into direct contact with metal and instead of sliding on such metal begins to stick to it, whereupon scuffing of the rubber and deterioration of its sealing surface follows. Under certain conditions scuffing of the rubber is accomplished with the rubber scuffings rolling into worm-like shapes of minute proportions. Such rubber scuffings tend to separate the mating surfaces permitting a slight leakage of oil. This condition is beneficial, and the seal while becoming leaky nevertheless may continue to operate and sometimes even to "reseal" itself when the scuffings are "washed out" by the oil. However, after another period of such operation, direct rubber-to-metal contact occurs again and is followed by more scuffing and further deterioration of the rubber surface. After this process is repeated several times, the seal becomes incapable of resealing itself and begins leaking badly, causing loss of lubricant or operating fluid in the presumably sealed receptacle.

In accordance with the invention I provide an improved seal in which the mating sealing surfaces of the seal and of the sealed movable member do not remain in continuous or constant contact but change frequently or are in intermittent contact, such as at every revolution of a rotating shaft, with one of such surfaces, either metal surface or rubber surface, being first exposed to the bath of oil within the receptacle and then coming in contact with the other sealing surface. Thus, the seal is, in effect, lubricated at every revolution of the shaft, maintaining the film of oil between the sealing surfaces and preventing occurrence of direct contact of the material of the seal with that of the movable member and the resulting failure of the seal.

In accordance with the invention, such intermittent contact of the surfaces is effected by causing relative movement of the sealing surface, such movement being other than rotation. With rotating shafts such relative movement may be caused by making the sealing metal surface eccentric and, therefore, sliding on the sealing surface of the seal in a radial direction for a certain predetermined distance. Under certain conditions the movable member, such as a rotating shaft, may be made longitudinally slidable with its sealing surface first moving out of contact with the seal and into the bath of oil and thereupon returning into the position of contact with the sealing surface of the seal. In case of both lip and face seals, the seal may also be perforated in order to permit the oil to reach the sealing surface of the metal which, upon passing at such hole will move into a sealing position, i.e. in sealing contact with the seal.

While particular reference has been made above to "rubber" seals, use of plastic materials such as tetrafluoro chloral ethylene plastic may be of particular advantage in many applications. Seals made of such material are not affected by oil, have a low coefficient of friction with metals, particularly steel, are temperature resistant at both extremities of the operative thermal range of the seal. Moreover, in accordance with the invention reinforced seals may also be used. Particularly, metal reinforced rubber seals used as diaphragms have particular advantages under many conditions.

Referring to the drawing, there are shown therein by way of example a number of constructions embodying the present invention. It will be understood that the constructions shown are illustrated and described by way of examples, and that the invention is not limited in its application to the details of construction and arrangement of parts illustrated in the accompanying drawing, since the invention is capable of other embodiments and of being practiced or carried out in various ways. Also, it is to be understood that the phraseology and terminology employed herein is for the purpose of description and not of limitation.

It shall be understood that I utilize the term "seal of the diaphragm type" to distinguish seals of a sheet construction, be they of the lip seal type or of the face seal type, from mere packing boxes such as is used to seal a reciprocating piston rod in a steam engine or in a reciprocating pump.

Referring specifically to the drawing, FIGS. 1 and 2 illustrate a seal embodying the present invention and adapted to seal the shaft 10 which has a portion 10a operating within the chamber 11 which is fully or partially filled with oil and a portion 10b operating outside of said oil chamber 11. The seal construction comprises an eccentric ring 15 which, in the present embodiment of the invention is mounted on a hub 16 in any suitable manner such as by being pressed thereon with said hub 16 being in turn sealingly mounted on the shaft 10, with the gasket 17 being interposed between the hub 16 and the shaft 10. An annular cage generally designated by the numeral 20 is sealingly fitted into the annular aperture provided in the wall 21 forming one of the walls of the oil chamber 11. The cage 20 may be of any suitable construction.

In the cage 20 there is mounted between the annular flanges 22 and 23 a seal 25 of the diaphragm type with the peripheral edges of said seal being pinched between said flanges 22 and 23 with the inner edges of the seal 25 terminating in close proximity to the shaft 10. The cage 20 is so mounted in the aperture of the wall 21 that the diaphragm 25 which in its free position extends in a plane normal to the shaft 10 is displaced longitudinally of the axis of the shaft 10 to cause the seal 25 to bulge and, therefore, to exert resilient pressure on the eccentric ring 15 contacting the same at an eccentric contacting sealing surface indicated in FIG. 2 by the numeral 26. Two points on said contacting surface are indicated in FIG. 2 by the numerals 27 and 28, above and below the shaft 10, respectively.

It will be understood that due to the eccentricity of the ring 15 a revolution of the shaft 10 through the angle of 180° will bring the high point of the ring 15 under the shaft as indicated at 29 and its low point above the shaft into a position indicated by the numeral 30. In consequence thereof, in the process of revolution of the shaft through 180° angle the point of contact indicated by the numeral 27 will move downwardly on the seal to the point indicated by the numeral 27a, i.e. closer to the shaft, while the point of contact indicated by the numeral 28 will move further away from the shaft into the position indicated by the numeral 28a. Inasmuch as such movement will be gradual, the point 27 will, in effect, slide on the seal in radial direction. On the other hand, the contact at the point 28 will change into the contact at the point 28a which was previously in contact with the bath of oil and, therefore, is lubricated. When the shaft continues to rotate through another 180°, the points of contact will come to their original position indicated in FIG. 1.

Thus, the annular contact surface between the ring 15 and the seal 25 will move in the radial direction with respect to the shaft, constantly lubricating itself and preventing the contact surface from becoming dry and coming into direct contact with each other. By such operation disadvantages of the prior constructions resulting in failures of prior seals are eliminated.

The construction of FIGS. 3 and 4 is similar in part to the above described construction, the main differences being in the fact that in this construction the shoulder 35 is concentric while the seal 36 has provided thereon a raised ridge or bead 37 which is eccentric with respect to the shaft 10. Therefore, as the shoulder 35 rotates, instead of being in continuous and constant contact with the seal at a contact line or strip, the contact surface of said shoulder is sliding relative to the seal 25, producing the self-lubricating effect on the sealing surfaces. A compression coil spring 38 may be provided to ensure resilient pressure of the seal 36 on the shaft shoulder 35. It will be understood that provision of the bead, such as bead 37, may be dispensed with, and a flat seal of the face type having an eccentric opening for the passage of the shaft, said opening being wholly within the outline of the shoulder 35, may be used with success.

It should be understood that in addition to self-lubricating function, due to the sliding nature of the contact, with the sliding being in the radial direction, the wear on the sealing surface is greatly increased and it is only a relatively small portion of it that is in contact at one moment of time. This feature of my invention is of great importance as increasing the life of the seals in addition to improving their effectiveness and dependability.

The construction of FIGS. 3 and 4 is particularly advantageous in high speed machinery where providing an eccentric metal shoulder or ring such as ring 15 of the construction of FIGS. 1 and 2 may cause unbalance of the rotating shaft, or may cause "inertia leakage" in seals of the construction such as shown in FIGS. 1 and 2.

In the construction of FIG. 5 the seal 40 is of the type known in the art as "lip seal." In accordance with the invention the edge of the seal on the side of the chamber 11 is cut on a plane inclined with respect to the shaft 10, as indicated at 41. Because of such a construction, similar sliding of the contacting surface in the direction other than that produced by rotation is effected, and self-lubrication of the seal is produced. For instance, as the shaft 10 rotates through the angle of 180°, the point 42 of the shaft which was previously exposed to oil is brought into the position indicated by the numeral 43 in which position it becomes a sealing surface. Revolution of the shaft 10 through the next 180° brings the same point again into the position indicated by the numeral 42, i.e. in a position to be lubricated.

FIG. 6 illustrates a seal of the lip type in which the seal 50 is provided along its sealing lip with holes 51 intended to bring the oil in contact with the sealing surface of the rotating shaft. While in this construction as well as in the construction of FIG. 6, there may be a very narrow area of the sealing surface not open to the oil through the holes 51, such area will be too narrow to become dry.

FIG. 7 indicates a construction having a rotating shaft 60 including a seal 61 of the conventional type. In accordance with the invention, the shaft 60, in addition to its rotation, is also caused to reciprocate through a short distance as indicated by the arrow 62, the reciprocation being in the direction of the oil chamber 11. By virtue of such a construction, self-lubrication of the sealing surface and resulting advantages are also effectively attained.

By virtue of the above described constructions, the objects of the present invention listed above and numerous additional advantages are attained.

I claim:
1. A sealing device for a rotatable shaft passing through an aperture in a wall having liquid on one of its sides, with said device intended to prevent passage of the liquid to the other side of the wall through said aperture both between stationary contacting surfaces as well as between surfaces in sliding contact, said sealing device comprising a metal casing sealingly fitted into said aperture, said casing sealing the liquid at the wall surfaces of said aperture and providing a peripheral pinching groove, a seal member of the diaphragm type having a central opening for passage of the shaft and its outer periphery sealingly pinched at said groove by said casing and closing said aperture, an eccentric collar sealingly and drivingly mounted on said shaft and providing sealable surfaces eccentrically rotatable with said shaft, said seal member contacting for sealing said sealable surfaces eccentrically rotating with said shaft, said seal member being adapted by the eccentricity of said surfaces to be intermittently in contact with the surfaces which were previously and during a portion of the rotation cycle portion of the shaft in contact with the liquid, thus replenishing with each revolution of the shaft a film of liquid between the intermittently contacting surfaces forming a rotating seal.

2. An oil seal device for a rotatable shaft having a portion operating within an enclosure containing oil and a portion extending outside of said enclosure through an aperture in the wall thereof, said seal device comprising a metal casing sealingly fitted into said aperture, said casing sealing the oil at the wall surfaces of said aperture and providing a peripheral pinching groove, a seal member of a diaphragm type having a central opening for passage of the shaft and its outer periphery sealingly pinched at said groove by said casing and closing said aperture, an eccentric collar sealingly and drivingly mounted on said shaft and providing transversely rounded sealable surfaces eccentrically rotatable with said shaft, said seal member contacting for sealing said sealable surfaces eccentrically rotating with said shaft, said seal member being adapted by the eccentricity of said surfaces to be intermittently in contact with the surfaces which were previously and during a portion of the rotation cycle portion of the shaft in contact with the mass of oil, thus replenishing with each revolution of the shaft a lubricating film of oil between the intermittently contacting surfaces forming a rotating seal, with the oil wedging in between said surfaces because of the transverse rounding of said collar.

References Cited in the file of this patent
UNITED STATES PATENTS

| 1,699,385 | Whittingham | Jan. 15, 1929 |
| 1,740,682 | Carrey | Dec. 24, 1929 |
| 2,279,669 | Friskney | Apr. 14, 1942 |
| 2,565,675 | Bottomley et al. | Aug. 28, 1951 |

FOREIGN PATENTS

| 10,368 | Germany | Sept. 29, 1955 |